Oct. 30, 1928.
R. E. BISSELL
1,689,193
TRANSMISSION MECHANISM
Filed Feb. 17, 1927     3 Sheets-Sheet 1
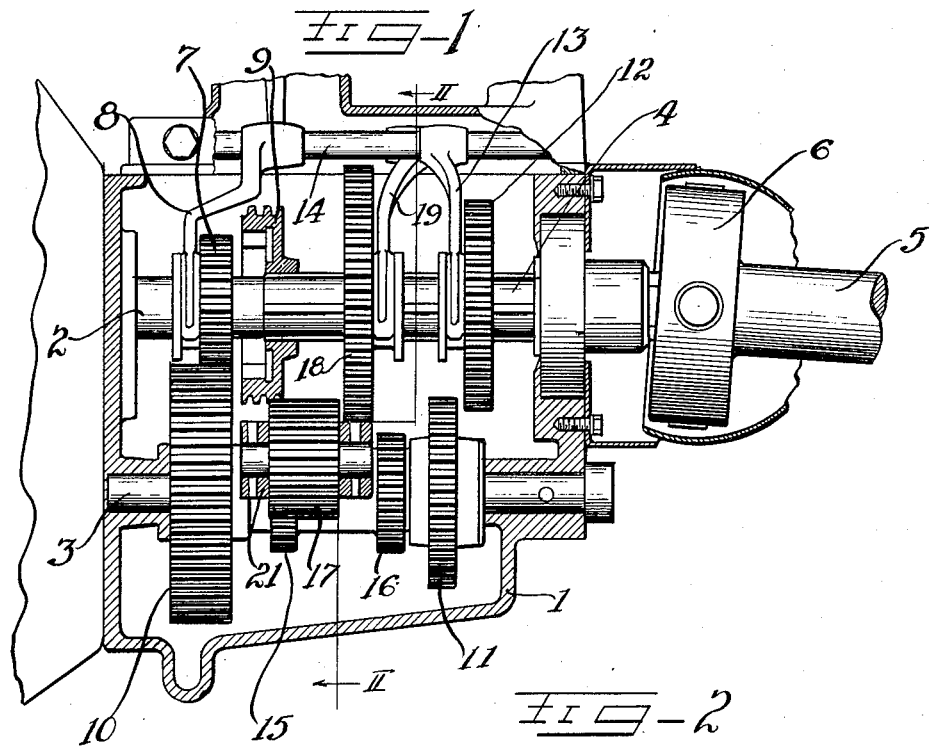
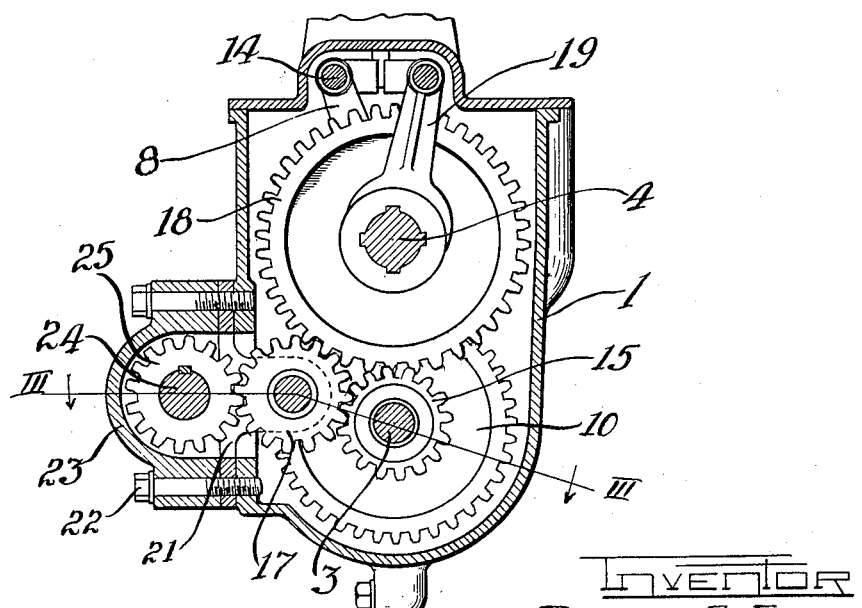
Inventor
Richard E Bissell
by Charles W Hill
Attys

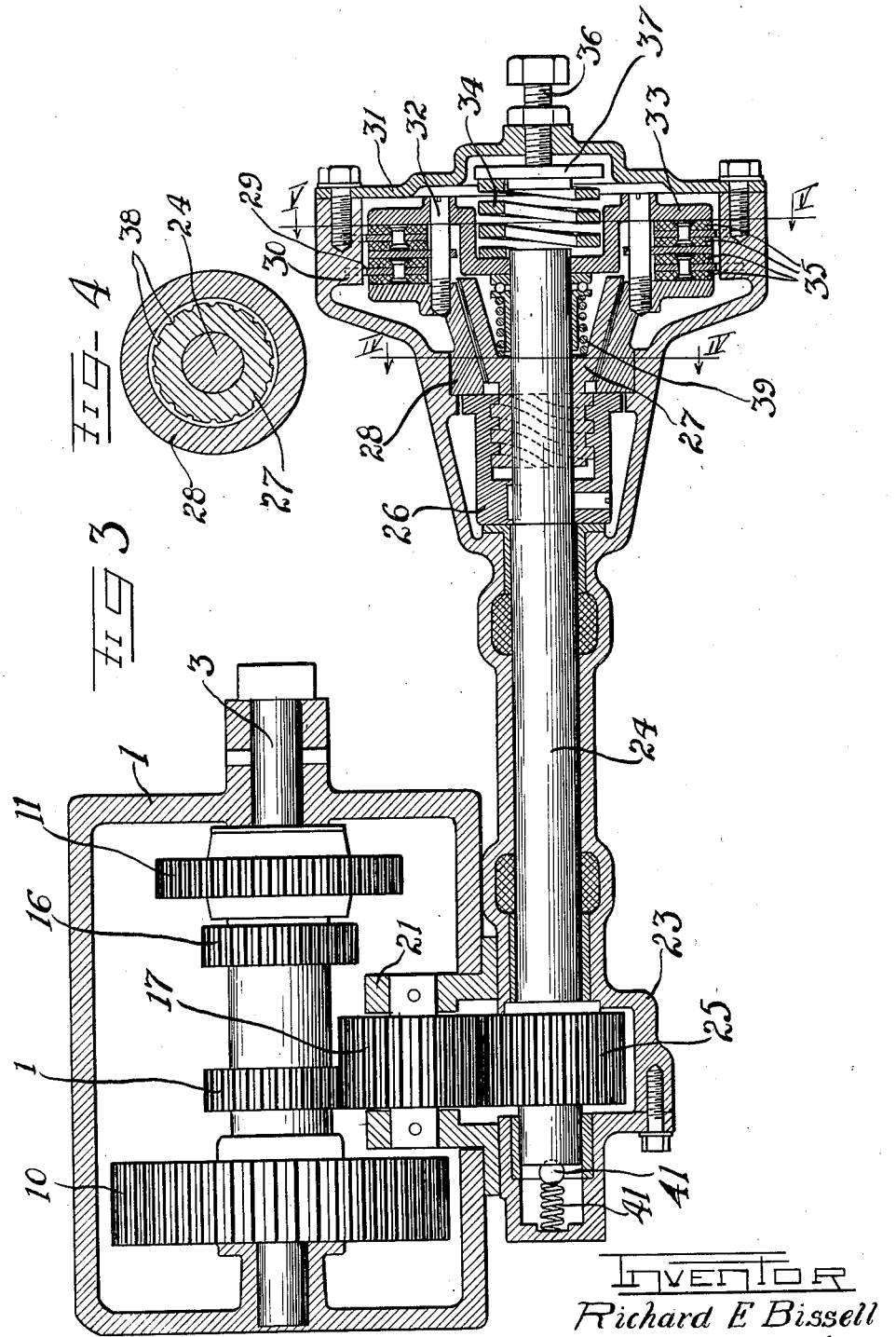

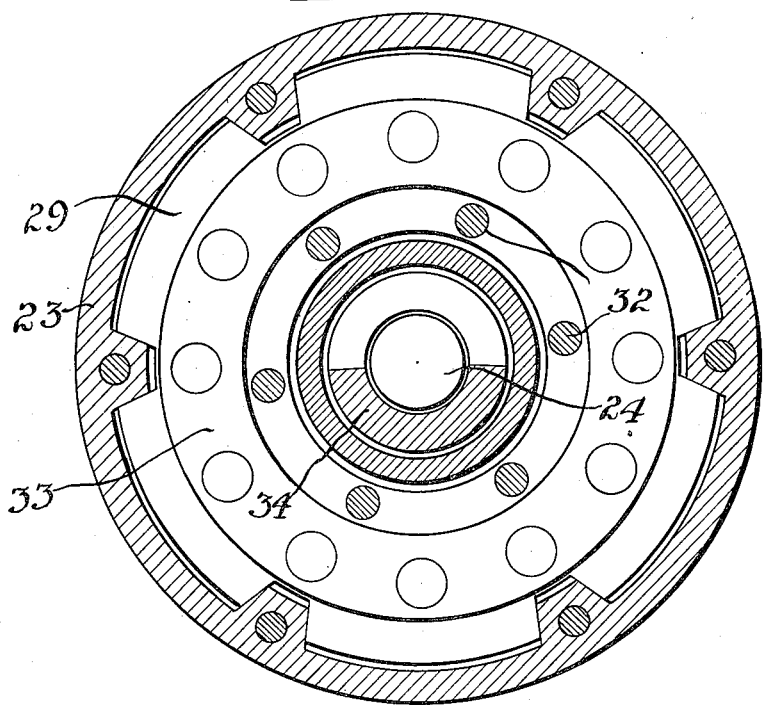
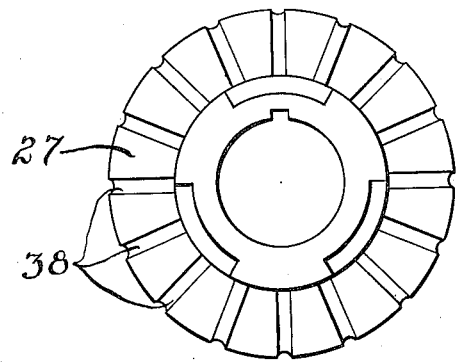

Patented Oct. 30, 1928.

1,689,193

UNITED STATES PATENT OFFICE.

RICHARD E. BISSELL, OF CLEVELAND HEIGHTS, OHIO, ASSIGNOR TO THOMPSON PRODUCTS, INC., OF CLEVELAND, OHIO, A CORPORATION OF OHIO.

TRANSMISSION MECHANISM.

Application filed February 17, 1927. Serial No. 168,865.

This invention relates to transmission mechanism more particularly designed for use on automobiles.

When starting an automobile on a hill it is necessary to keep the brake engaged until ready to operate the clutch. If there is any interval between releasing the brake and throwing in the clutch, the car under the action of gravity, will start traveling backwards. In fact, such rearward movement will take place unless the friction of the clutch at the time the brakes are released below the point necessary to hold the car, is sufficient to compensate for the reduced braking friction. This is difficult to do in practise.

Further when going up a hill changing gears is often postponed until the car has nearly stopped and then in the interval of changing gears the car loses what little forward momentum it may have and starts to run backwards.

It has been proposed to provide ratchet gearing to obviate such backward movement. Ratchet gearing on the propeller shaft or wheel shafts has the disadvantage that means must be provided for moving the ratchet into inoperative position whenever it is desired to reverse. Such an arrangement adds an additional operation to the reversing of a car.

To avoid this difficulty it has been proposed to connect some form of ratchet or similar positively and instantaneously acting irreversible gearing to the parts of the transmission mechanism lying between the clutch shaft and the propeller shaft which are always driven in the same direction.

With this arrangement the car may be driven either forward or backwards in the usual way and cannot under the action of gravity move in the opposite direction so long as the gears are in mesh, but in neutral, the car is still free to move in either direction and frequently also in high speed when the clutch and propeller shafts are directly connected and the counter shaft and change speed and reverse gears are disconnected from the clutch shaft.

When starting on a hill a car with ordinary transmission, the operations should be to release the clutch, throw in low, release the brake, and then let in the clutch. With a ratchet on the countershaft of the transmission gear there will, if this sequence of operations is followed, be no retrograde movement of the car. In actual practise, however, it often happens that the brake is released before placing the gears in low so that by the time the gears are in mesh, the car is moving backwards. Further, when changing speeds on a hill it may happen that before gears can be changed the car begins to slide backwards under the action of gravity. In either of these or other similar circumstances when the gears come into mesh, the car is suddenly brought to a stop by the ratchet throwing great strain on the latter as well as the other parts of the transmission.

One of the principal objects of the present invention is to avoid such sudden stoppage by substituting for an instantaneously acting check, one which will operate more gradually, preferably by absorption and dissipation of the energy of the rearwardly moving car rather than absorption and storage of such energy although the latter method is within the scope of my invention. Conveniently this may be brought about by providing a frictionally operating brake brought into operation by backward movement of the car, when gearset is set in forward gear, or forward movement of car when gearset is in position to reverse, the frictional force being sufficient to hold the car on any ordinary hill and yet insufficient to check previously acquired retrograde movement too suddenly.

Other and further important objects of this invention will be apparent from the disclosures in the accompanying drawings and specification.

On the drawings:

Figure 1 is a side view of an automobile transmission gear with the casing and other parts in section.

Figure 2 is a section on the line II—II of Figure 1.

Figure 3 is a section on the line III—III of Figure 2.

Figure 4 is a section of the cone clutch members and supporting shaft, with other parts omitted, on the line IV—IV of Figure 3.

Figure 5 is a section on the line V—V of Figure 3.

Figure 6 is an end view of one of the clutch members.

As shown on the drawings:

In the drawings 1 represents the casing of an automobile transmission having the usual clutch shaft 2, countershaft 3, sliding gear shaft 4, and propeller shaft 5 which is connected to the sliding gear shaft by a universal joint 6. In the form shown there are three speeds forward and one reverse. For the highest speed forward the gear 7 which normally drives the countershaft gears is moved along its shaft 2 by a yoke 8 to bring its teeth in engagement with internally arranged teeth on the gear 9 rigidly attached to the end of the sliding gear shaft 4. When the gears 7 and 9 are thus in mesh, the clutch shaft 2 and the sliding gear shaft 4 are directly coupled so that there is a straight drive from the engine to the rear wheels. For the intermediate low and reverse positions, the countershaft gears are employed. At one end of the countershaft is gear 10 which is in mesh with the gear 7 except when such gear is in engagement with the internal gear 9. The countershaft also carries the intermediate gear 11 which is arranged to mesh with gear 12 on the shaft 4 when the latter gear is moved to the left (Figure 1) by its yoke 13. As the yokes 8 and 13 are mounted on the same sliding bar 14, movement of the gear 12 to the left to bring it into engagement with gear 11 will also move gear 7 in the same direction. For this reason gear 10 is made twice the width of gear 7 so as to be in mesh with the latter at all times except on high speed direct drive.

The countershaft also carries two gears 15 and 16. The gear 15 is always in mesh with a wide gear 17 which is the reverse idler gear. The sliding gear 18 on the shaft 4 is arranged so that by means of its yoke 19 it may be moved into mesh with the gear 16 for low speed and the gear 17 for reverse.

It will be evident that the clutch shaft 2, the gears mounted thereon and the gears mounted on the countershaft, viz: 7, 10, 11, 15, and 16, as well as the reverse idler gear 17, will always be driven by the engine in the same direction irrespective of the direction in which the car is driven. The irreversible gear forming part of this invention is, therefore, preferably connected to either shaft 2 or gears 7, 10, 11, 15, 16, or 17 without interfering with the intentional reversal of the direction of movement of the car. If the irreversible gear is connected to the sliding gear or propeller shafts, means must be provided for rendering such gear inoperative on reverse or reversing such car when the transmission gear is in reverse.

The particular arrangement illustrated is preferred as enabling the irreversible gear to be applied to existing cars with no change in the standard equipment. This is possible by reason of the fact that transmission casings are now made with an aperture therein for the bracket 21 which carries the reverse idler gear 17, this bracket being clamped to the casing by the bolts 22. All that is required, therefore, is to attach the housing 23 which contains the irreversible gearing to the casing 1 in place of the present cover of the aperture through which the reverse idler gear 17 is inserted.

Except where convenience in application to existing cars or structural questions arise it is in general advisable to arrange the irreversible gear as near to the rear wheels as possible to reduce possible back-lash. This casing 23 has journaled therein a shaft 24 having at one end a gear 25 rigidly secured thereto for engagement with the reverse idler pinion 17 so that the shaft 24 is in rotation at all times the countershaft is rotated. The countershaft is connected to the propeller shaft at all times except when the gears are in neutral, as shown in Figure 1, or when the gears 7 and 9 are in mesh for the high speed direct drive. Hence, except under the foregoing conditions control of the rotation of the shaft 24 means control of the propeller shaft and thereby of the movement of the car. In the particular construction illustrated reverse rotation of the shaft 24 is inhibited by a frictional brake or clutch connected to the shaft 24 on reverse rotation only. For this purpose an internally threaded sleeve 26 is rigidly secured to the shaft 24. This sleeve has threaded engagement with one end of a member 27 slidably and rotatably mounted on the shaft 24. The other end of the sleeve 27 is conical in form for frictional engagement with a rotatably mounted member 28. The threads on the parts 26 and 27 are right handed so that when these parts are revolving in the direction in which they are driven by the engine, the action of the threads is to force the conical part of the member 27 away from the member 28. Should, however, these parts be driven in an opposite direction, the rotation of the shaft 24 and the member 26 has the effect of drawing the conical part of member 27 and member 28 firmly into contact so that the member 28 rotates with the shaft 24.

The member 28 has connected thereto a friction clutch which comprises a series of plates or annular rings 29 having recesses around the periphery for sliding engagement with lugs 30 on the interior of the casing 23. Between these plates 29 is an annular ring 31 apertured for sliding engagement with pins 32 threaded into the member 28. Also having sliding engagement with the pins 32 is a cup-shaped member 33 which is pressed toward the member 28 by means of a spring 34. Secured to either side of the plates 24 are annular rings of friction material 35. The material of which these disks are made may conveniently be asbestos composition similar to that now used in brake linings. With this arrangement, the pressure of the spring 34 causes frictional engagement between the rings 35 and the outwardly extending flange of the member 28, the annular ring 31 and the outwardly extending flange of the cup-shaped part 33. The thrust so produced on the shaft 24 is conveniently taken by a ball 40 and spring 41 at the opposite end of the shaft. The frictional resistance so provided may be varied by adjusting the position of the bolt 36 which bears against the plate 37 against which rests the end of the spring 34. This frictional resistance is normally adjusted so that it is sufficient to hold the car from backward movement on any ordinary grade, but yet is insufficient to check the car too suddenly if the gears are brought into mesh after the car is moving rearwardly. It will be seen that as the device works by friction, it brings the car to rest by the gradual absorption and dissipation of energy and consequently there is no jamming of the parts requiring great force to put the parts into movement again and at the same time avoids the sudden jar to the transmission gear and all the parts associated therewith which would be occasioned by the use of ratchet or similar gear which when brought into operation would cause the car to stop instantly. The casing 23 is preferably partially filled with oil or grease to give smooth running and reduce wear. To enable the conical parts of the members 27 and 28 to grip when necessary, one of these parts, as 27, is provided with longitudinal grooves 38, as shown more particularly in Figures 4 and 6.

It will be understood that the threaded sleeves and cone operated thereby are only one of various forms of mechanism which might be used for bringing the frictional clutch or brake into operation. The important feature of the invention is the provision of means whereby should the car be moving in a backward direction when the gears are placed in operation, there will be a gradual absorption of the kinetic energy of the moving car whether by frictional means or by energy storage means.

It will also be understood that the particular form of friction clutch or brake is merely illustrated by way of example and may assume widely different forms, without departing from the spirit of my invention.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. Transmission mechanism comprising a clutch shaft, a propeller shaft, gears for connecting said shafts for both forward and reverse drives, and energy absorption means for inhibiting rotation of the propeller shaft in a direction opposite to that for which said gears is set whether forward or reverse.

2. Transmission mechanism comprising a clutch shaft, a propeller shaft, a gear mechanism adapted to connect said clutch and propeller shafts, and means operated by a portion of said driving and gear mechanism which is driven in the same direction irrespective of the direction of rotation of the propeller shaft for inhibiting by gradual energy absorption the rotation of such portion of the gear mechanism in a reverse direction whether the gears are set to drive the propeller shaft forward or reverse.

3. Transmission mechanism comprising a clutch shaft, a propeller shaft, a gear mechanism adapted to connect said clutch and propeller shafts, a frictionally acting brake, and means adapted operatively to connect said brake to a portion of said driving and gear mechanism which is driven in the same direction irrespective of the direction of rotation of the propeller shaft whenever such portion of the gear mechanism turns in reverse direction whether the gears are set to drive the propeller shaft forward or reverse.

4. Transmission mechanism comprising a clutch shaft, a propeller shaft, gear mechanism adapted to connect said clutch and propeller shafts, a control shaft rotatably connected to that portion of said driving and gear mechanism which is driven in the same direction irrespective of the direction of rotation of the propeller shaft, a brake member concentric with respect to said control shaft, and means for operatively connecting said control shaft and brake member in one direction of rotation only of said control shaft whether the gears are set to drive the propeller shaft forward or reverse.

5. Transmission mechanism comprising a clutch shaft, a propeller shaft, gear mechanism adapted to connect said clutch and propeller shafts, a control shaft rotatably connected to that portion of said driving and gear mechanism which is driven in the same direction irrespective of the direction of rotation of the propeller shaft, a brake member concentric with respect to said control shaft, an internally threaded member, an externally threaded member engaged therewith, both members being concentrically arranged with respect to said control shaft, one of said members being rigidly and the other slidably and rotatably mounted on said control shaft to allow the former to move the latter longitudinally in one direction when the former is rotated in one direction and in the opposite direction when the direction of rotation is reversed, and a clutch for operatively connecting said brake and slidable members when the latter is moved longitudinally in one direction only.

6. Transmission mechanism comprising an engine clutch, a clutch shaft, a propeller shaft, connecting gearing therebetween, and a frictionally acting brake independent of the engine clutch for inhibiting reverse rotation of the propeller shaft.

7. Transmission mechanism comprising a clutch shaft, a counter shaft, a propeller shaft, gearing adapted operatively to connect said shafts including a reverse idler pinion, a control shaft, a pinion on said control shaft in mesh with said reverse idler pinion, a brake member concentric with respect to said control shaft, and means for operatively connecting said control shaft and brake member in one direction of rotation only of said control shaft.

8. Transmission mechanism comprising a clutch shaft, a counter shaft, a propeller shaft, gearing adapted operatively to connect said shafts including a reverse idler pinion, a control shaft, a pinion on said control shaft in mesh with said reverse idler pinion, and means for inhibiting reverse rotation of said control shaft.

9. Transmission mechanism comprising an engine clutch, a clutch shaft, a propeller shaft, gears for connecting said shafts for both forward and reverse drives, and energy absorption and dissipation means independent of the engine clutch for inhibiting rotation of the propeller shaft in a direction opposite to that for which said gears are set whether the gears are set to drive the propeller shaft forward or reverse.

10. Transmission mechanism comprising a clutch shaft, a counter shaft, a propeller shaft, gearing adapted operatively to connect said shafts including a reverse idler pinion, a control shaft, a pinion on said control shaft in mesh with said reverse idler pinion, a frictionally acting brake and a uni-directional clutch for operatively connecting said control shaft and said brake.

11. Transmission mechanism comprising a clutch shaft, a propeller shaft, a gear mechanism adapted to connect said clutch and propeller shafts, a frictionally acting brake and uni-directional clutch mechanism adapted operatively to connect said brake to said portion of said driving and gear mechanism which is driven in the same direction irrespective of the direction of rotation of the propeller shaft.

12. Transmission mechanism comprising a clutch shaft, a propeller shaft, gear mechanism adapted to connect said clutch and propeller shafts, including a reverse idler pinion, a control shaft, a pinion on said control shaft in mesh with said reverse idler pinion, a brake member concentric with respect to said control shaft, an internally threaded member, an externally threaded member engaged therewith, both members being concentrically arranged with respect to said control shaft, one of said members being rigidly and the other slidably and rotatably mounted on said control shaft to allow the former to move the latter longitudinally in one direction when the former is rotated in one direction and in the opposite direction when the direction of rotation is reversed, and a clutch for operatively connecting said brake and slidable members when the latter is moved longitudinally in one direction only.

13. Transmission mechanism comprising a clutch shaft, a propeller shaft, gear mechanism adapted to connect said clutch and propeller shafts, a control shaft rotatably connected to that portion of said driving and gear mechanism which is driven in the same direction irrespective of the direction of rotation of the propeller shaft, a series of concentric annular rings alternately rotatable and non-rotatable, means for pressing said rings into frictional engagement, and an unidirectional clutch for operatively connecting said control shaft and said rotatable rings.

14. A uni-directional clutch comprising a shaft, an internally threaded member, an externally threaded member engaged therewith, both members being concentrically arranged with respect to said shaft, one of said members being rigidly mounted on said shaft and the other axially and rotatably movable relatively to said shaft, and a clutch, one member of which is operatively connected to said axially movable member.

15. A uni-directional clutch comprising a shaft, an internally threaded member, an externally threaded member engaged therewith, both members being concentrically arranged with respect to said shaft, one of said members being rigidly mounted on said shaft and the other axially and rotatably movable relatively to said shaft, a cone connected to said axially movable member, and a rotatable conical member adapted to be frictionally engaged by said cone when the latter is moved axially in one direction only.

In testimony whereof I have hereunto subscribed my name.

RICHARD E. BISSELL.